United States Patent
Takamura et al.

(10) Patent No.: US 9,474,103 B2
(45) Date of Patent: *Oct. 18, 2016

(54) PORTABLE INFORMATION TERMINAL, A CONTROL METHOD FOR A PORTABLE INFORMATION TERMINAL, A PROGRAM OF A METHOD OF CONTROLLING A PERSONAL INFORMATION TERMINAL AND A RECORDING MEDIUM HAVING RECORDED THEREIN A PROGRAM OF A METHOD OF CONTROLLING A PERSONAL INFORMATION TERMINAL

(75) Inventors: Kazuhisa Takamura, Tokyo (JP); Masataka Wakamatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1645 days.

This patent is subject to a terminal disclaimer.

(21) Appl. No.: 11/670,282

(22) Filed: Feb. 1, 2007

(65) Prior Publication Data

US 2007/0129070 A1 Jun. 7, 2007

Related U.S. Application Data

(63) Continuation of application No. 10/437,064, filed on May 14, 2003, now Pat. No. 7,221,957.

(30) Foreign Application Priority Data

May 22, 2002 (JP) .................................. 2002-147163

(51) Int. Cl.
| | |
|---|---|
| *H04B 1/38* | (2015.01) |
| *H04W 88/06* | (2009.01) |
| *H04M 1/725* | (2006.01) |
| *H04N 7/14* | (2006.01) |

(52) U.S. Cl.
CPC ......... *H04W 88/06* (2013.01); *H04M 1/72577* (2013.01); *H04N 7/141* (2013.01)

(58) Field of Classification Search
CPC . H04W 88/06; H04M 1/72577; H04N 7/141
USPC ...... 455/445, 422.1, 512, 513, 550.1, 552.1, 455/553.1, 41.2, 432.1, 435.1, 418–420
See application file for complete search history.

(56) References Cited

U.S. PATENT DOCUMENTS

| | | | |
|---|---|---|---|
| 5,870,682 A | 2/1999 | Miwa et al. | |
| 5,911,121 A | 6/1999 | Andrews | |

(Continued)

FOREIGN PATENT DOCUMENTS

| | | |
|---|---|---|
| JP | 7-307971 | 11/1995 |
| JP | 10 327463 | 12/1998 |

(Continued)

*Primary Examiner* — Ajit Patel
(74) *Attorney, Agent, or Firm* — Oblon, McClelland, Maier & Neustadt, L.L.P.

(57) ABSTRACT

The present invention is applied to a portable personal computer or the like having a plurality of wireless communication means, for example, so as to provide a user with appropriate wireless communication means in a situation where a plurality of wireless communication means are available. According to the present invention, the wireless communication means is selectively used in accordance with an application program with reference to a communication management table in which at least wireless communication means allowed to be used is described with regard to respective application programs.

22 Claims, 8 Drawing Sheets

(56) References Cited

U.S. PATENT DOCUMENTS

| | | | |
|---|---|---|---|
| 6,091,956 | A | 7/2000 | Hollenberg |
| 6,317,755 | B1 | 11/2001 | Rakers et al. |
| 6,445,921 | B1 | 9/2002 | Bell |
| 6,525,768 | B2 | 2/2003 | Obradovich |
| 6,608,567 | B2 | 8/2003 | Matsumoto |
| 6,681,259 | B1 * | 1/2004 | Lemilainen et al. ......... 709/250 |
| 6,766,160 | B1 | 7/2004 | Lemilainen et al. |
| 6,807,417 | B2 | 10/2004 | Sallinen et al. |
| 6,865,385 | B1 | 3/2005 | Kohda et al. |
| 6,882,677 | B2 * | 4/2005 | Dehner et al. ............... 375/132 |
| 7,035,595 | B1 | 4/2006 | Kim et al. |
| 7,296,284 | B1 * | 11/2007 | Price et al. .................... 725/39 |
| 7,543,227 | B2 * | 6/2009 | Griswold et al. ............ 715/234 |
| 2001/0049262 | A1 | 12/2001 | Lehtonen |
| 2002/0098804 | A1 * | 7/2002 | Jung ............................. 455/41 |
| 2002/0102974 | A1 | 8/2002 | Raith |
| 2002/0128036 | A1 * | 9/2002 | Yach et al. ................... 455/552 |
| 2002/0147008 | A1 * | 10/2002 | Kallio .......................... 455/426 |
| 2002/0183038 | A1 * | 12/2002 | Comstock et al. ........... 455/406 |
| 2002/0197954 | A1 * | 12/2002 | Schmitt et al. ................. 455/41 |
| 2003/0005066 | A1 * | 1/2003 | Lazaridis et al. ............. 709/206 |
| 2003/0013483 | A1 * | 1/2003 | Ausems et al. ............... 455/556 |
| 2003/0098929 | A1 | 5/2003 | Nono |
| 2003/0142641 | A1 * | 7/2003 | Sumner et al. ............... 370/328 |
| 2003/0176186 | A1 | 9/2003 | Mohammed |
| 2004/0067754 | A1 * | 4/2004 | Gao et al. ..................... 455/442 |
| 2004/0203815 | A1 * | 10/2004 | Shoemake et al. ........... 455/450 |
| 2004/0204041 | A1 | 10/2004 | Fillebrown et al. |
| 2006/0291455 | A1 * | 12/2006 | Katz et al. .................... 370/328 |
| 2007/0190974 | A1 * | 8/2007 | Zhang .......................... 455/411 |

FOREIGN PATENT DOCUMENTS

| | | |
|---|---|---|
| JP | 10-327463 | 12/1998 |
| JP | 2000-332642 | 11/2000 |
| JP | 2001-309445 | 11/2001 |

* cited by examiner

| SHIFT TARGET SYSTEM / APPLICATION | PHS | WIRELESS LAN |
|---|---|---|
| TELEPHONE | ◯ (FORCED DISCONNECTION) TELEPHONE | ◯ (FORCED DISCONNECTION E-MAIL, VOICE MAIL) |
| E-MAIL TRANSMISSION/ RECEPTION | ◯ (AVAILABILITY DETECTED) E-MAIL TRANS- MISSION/RECEP- TION (2ND PRIORITY) | ◯ (AVAILABILITY DETECTED) E-MAIL TRANS- MISSION/RECEP- TION (1ST PRIORITY) |
| VIDEOPHONE | ◯ (AVAILABILITY DETECTED) TELEPHONE | ◯ (AVAILABILITY DETECTED) VIDEOPHONE |

FIG. 9

| SHIFT TARGET SYSTEM / APPLICATION | PHS | CELLULAR PHONE |
|---|---|---|
| E-MAIL TRANSMISSION/ RECEPTION | ◯ (FORCED DISCONNECTION) E-MAIL TRANS- MISSION/RECEP- TION | × |
| WEB ACCESS | × | × |
| VIDEOPHONE | ◯ (FORCED DISCONNECTION) VIDEOPHONE | ◯ (FORCED DISCONNECTION) TELEPHONE |

PORTABLE INFORMATION TERMINAL, A CONTROL METHOD FOR A PORTABLE INFORMATION TERMINAL, A PROGRAM OF A METHOD OF CONTROLLING A PERSONAL INFORMATION TERMINAL AND A RECORDING MEDIUM HAVING RECORDED THEREIN A PROGRAM OF A METHOD OF CONTROLLING A PERSONAL INFORMATION TERMINAL

CROSS REFERENCES TO RELATED APPLICATIONS

This application is based upon U.S. application Ser. No. 10/437,064, filed on May 14, 2003 and claims the benefit of Japanese Patent Application JP 2002-147163, filed May 22, 2002, the entire contents of which is being incorporated herein by reference.

BACKGROUND OF THE INVENTION

1. Field of the Invention

The present invention relates to a portable information terminal, a method of controlling a portable information terminal, a program of a method of controlling a portable information terminal and a recording medium having recorded therein a program of a method of controlling a portable information terminal, and, by way of example, may be applied to a cellular phone having a plurality of wireless communication means or the like. In the present invention, wireless communication means is selectively used in accordance with an application in correspondence with a management table in which at least wireless communication means allowed to be used with regard to respective application programs is described so as to allow a user to use appropriate wireless communication means in a situation that a plurality of wireless communication means are available.

2. Description of Related Art

Conventionally, a variety of wireless communication means including those used in a wireless LAN (Local Area Network), a cellular phone network and the like have been provided for information processing apparatuses such as personal computers.

As an exemplary method using such a wireless communication means, in Japanese Patent Application Laid-Open No. 2001-274816 publication, for example, there is suggested a method in which a suitable access point is selected among a plurality of wireless access points by making use of functional information such as functional information of electric field strength, an IP (Internet Protocol) address, an access point and the like.

SUMMARY OF THE INVENTION

It should be noted that such various wireless communication means have advantages and disadvantages. In other words, data communication can be carried out at a lower price and at a higher speed in the wireless LAN in comparison with the cellular phone network. However, in a case where an apparatus is moving at high speed, the line may frequently be disconnected in such a wireless LAN. In specific, initial connections and disconnections frequently occur not only in the case of the apparatus moving at high speed but also in a case of a wireless LAN established along a highway on which such apparatuses frequently passes.

On the other hand, it is conceivable that wireless communication means available in an information processing apparatus will grow increasingly diverse. In addition, wireless communication means available in a single application will also diverse, as telephones through a cellular phone network and IP telephones through a wireless LAN, for example.

In such a situation where a plurality of wireless communication means are available as described above, it is preferable that an appropriate one among the plurality of wireless communication means is provided to a user.

The present invention has been made in view of the above-described points, and is to provide a portable information terminal, a method of controlling a portable information terminal, a program of a method of controlling a portable information terminal and a recording medium having recorded therein a program of a method of controlling a portable information terminal, which are capable of providing an appropriate wireless communication means to a user in a situation where a plurality of wireless communication means are available.

According to one aspect of the present invention, the present invention is applied to a portable information terminal having a plurality of wireless communication means and a controller for controlling the wireless communication means. The controller transmits and receives data using corresponding wireless communication means in response to a request from an application program in accordance with a communication management table in which at least wireless communication means allowed to be used is described with regard to respective application programs.

In addition, in another aspect, the present invention is applied to a control method of a portable information terminal having a plurality of wireless communication means. According to the method, data is transmitted and received using corresponding wireless communication means in response to a request from an application program in accordance with a communication management table in which at least wireless communication means allowed to be used is described with regard to respective application programs.

In addition, in still another aspect, the present invention is applied to a program of a method of controlling a portable information terminal having a plurality of wireless communication means. According to the program, data is transmitted and received using corresponding wireless communication means in response to a request from an application program in accordance with a communication management table in which at least wireless communication means allowed to be used is described with regard to respective application programs.

In addition, in a further another aspect, the present invention is applied to a recording medium having recorded therein a program of a method of controlling a portable information terminal having a plurality of wireless communication means. According to the method, data is transmitted and received using corresponding wireless communication means in response to a request from an application program in accordance with a communication management table in which at least wireless communication means allowed to be used is described with regard to respective application programs.

According to the present invention, data is transmitted and received using corresponding wireless communication means in response to a request from an application program in accordance with a communication management table in which at least wireless communication means allowed to be used is described with regard to respective application programs so that it becomes possible to transmit and receive data using wireless communication means in conformity with respective application programs. Accordingly, in compliance with a description in the communication management table, it is possible to provide a user with appropriate wireless communication means in a situation where a plurality of wireless communication means are available.

In addition, it is also possible to provide a method of controlling a portable information terminal, a program of a method of controlling a portable information terminal and a recording medium having recorded therein a program of a method of controlling a portable information terminal, which are capable of providing appropriate wireless communication means to a user in the situation where a plurality of wireless communication means are available.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Now, with reference to the attached drawings, embodiments of the present invention will be described.

(1) First Embodiment
(1-1) Constitution of First Embodiment

Figure 1:
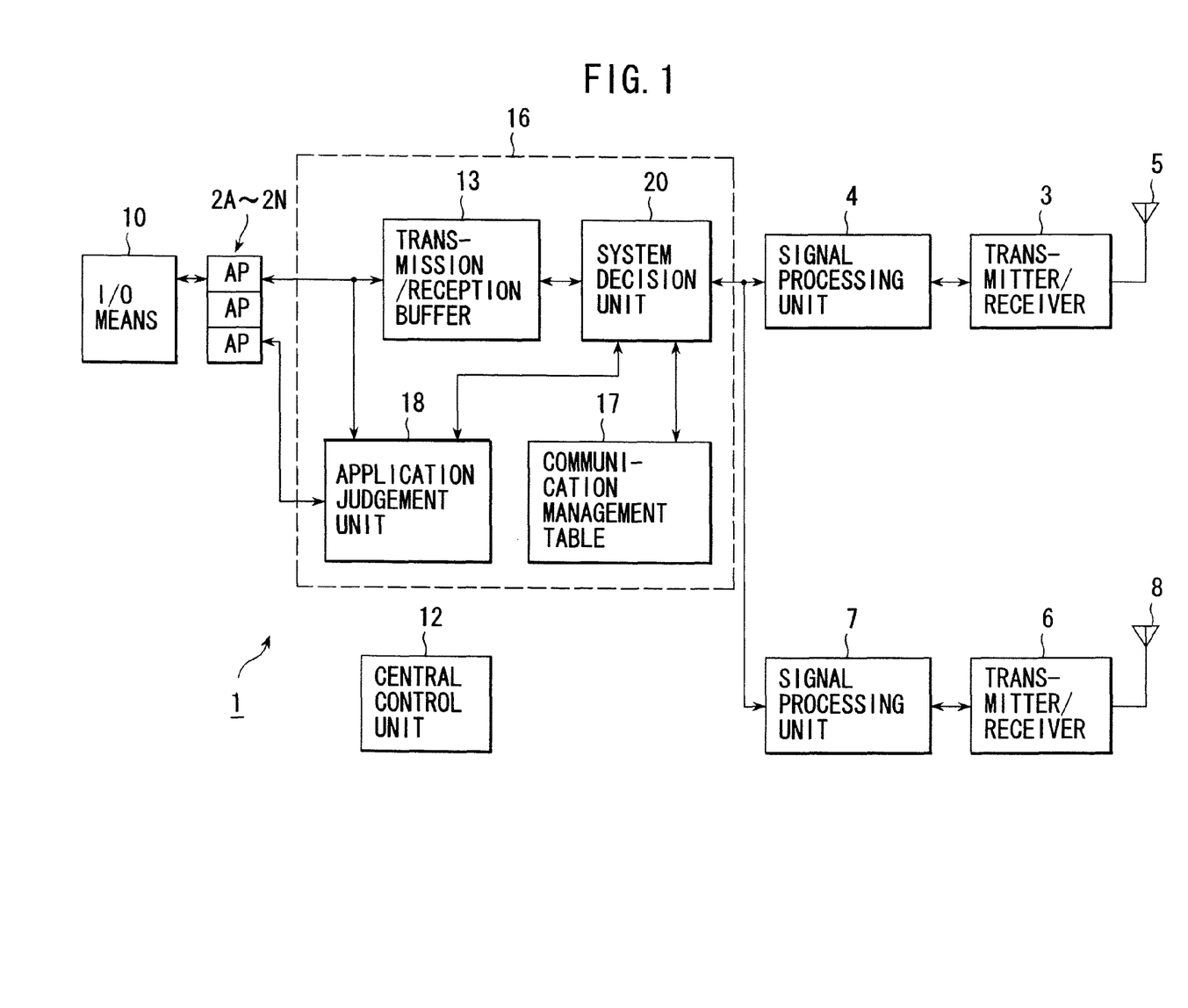
FIG. 1 is a block diagram showing a portable information terminal according to a first embodiment of the present invention.

FIG. 1 is a block diagram which shows a portable information terminal 1 according to a first embodiment of the present invention. This portable information terminal 1 is a cellular phone which is connectable to a wireless LAN. A user operates operating elements such as buttons to run application programs (AP) 2A to 2N corresponding to the operation. Various processing steps are carried out with the application programs 2A to 2N so as to connect to a cellular network or a wireless LAN if required.

In the portable information terminal 1, a transmitter/receiver 3 is a transmitter/receiver operable in a PDC (Personal Digital Cellular) system, a GSM (Global System for Mobile Communication) system or the like. Under control of a communication control program corresponding to a system thereof, the transmitter/receiver 3 sends various data input from a signal processing unit 4 through an antenna 5, and, processes an RF signal received through the antenna 5 to output the processed data to the signal processing unit 4. Similarly, the signal processing unit 4 carries out modulation/demodulation on various data regarding to the data communication so as to transmit to and receive from the transmitter/receiver 3, under control of the corresponding communication control program. Accordingly, in the portable information terminal 1, the transmitter/receiver 3, the signal processing unit 4 and the communication control program controlling them constitute wireless communication means based on a cellular network.

On the other hand, a transmitter/receiver 6 is a transmitter/receiver in conformity with IEEE (The Institute of Electrical and Electronics Engineers, Inc.) 802.11, HIPERLAN, and the like. The transmitter/receiver 6 sends various data input from a signal processing unit 7 through an antenna 8, and, processes an RF signal received through the antenna 8 to output the processed data to the signal processing unit 7, under control of a communication control program corresponding thereto. Similarly, the signal processing unit 7 carries out modulation/demodulation on various data regarding to the data communication so as to transmit to and receive from the transmitter/receiver 6, under control of the corresponding communication control program. Accordingly, in the portable information terminal 1, the transmitter/receiver 6, the signal processing unit 7 and the communication control program controlling them constitute wireless communication means based on a wireless LAN.

Input/output (I/O) means 10 comprises input means and output means. The input means comprises an operating element for selecting a menu corresponding to the application programs 2A to 2N, character input means such as a touch panel, image capturing means having an image capturing mechanism, voice input means such as microphone for capturing user's voice, and the like. The output means comprises display means for displaying input results and various images input through the input means, voice output means for outputting voice, and the like.

The application programs 2A to 2N are programs previously installed in the portable information terminal 1. The portable information terminal 1 has at least an application program using a communication function of the portable information terminal 1, as one of such application programs. In this embodiment, an application program for allowing the portable information terminal 1 to function as a cellular phone, a browser software and an e-mail software are applied as the application programs utilizing the communication function of the portable information terminal 1.

Each of the application programs 2A to 2N is activated by a central controlling unit 12 which is constituted with an operating system in accordance with a user's operation detected through the I/O means 10, and carries out predetermined processing steps in response to various operations by the user detected through the I/O means 10.

In the application program allowing the portable information terminal 1 to function as a cellular phone, as a result of the series of processing, a connection to a destination that the user desires is established through a communication management unit 16. Then, voice data is transmitted to and received from the target through a transmission/reception buffer 13, and the voice data is input to and output from the I/O means 10. The communication management unit 16 includes an arithmetic processing unit (not shown) for executing a communication management program, the transmission and reception buffer 13, a system decision unit 20, an application judgment unit 18 and a communication management table 17.

In addition, in accordance with the browser software, the portable information terminal 1 accesses a predetermined URL through the communication management program unit 16, receives various data obtained from an Internet website of the URL through the transmission/reception buffer 13, and displays the data on the I/O means 10 and outputs the voice data through the I/O means 10.

In addition, according to the e-mail software, the user receives input of e-mail through the I/O means 10. In addition, in accordance with the e-mail software, the portable information terminal 1 accesses a mail server through the communication management unit 16 and sends e-mail to the mail server through the transmission/reception buffer 13. Similarly, after acquiring the e-mail stored in the mail server through the transmission/reception buffer 13, the terminal 1 displays the e-mail on the I/O means 10. Here, the transmission/reception buffer 13 is a buffer memory for temporarily holding data which is generated through execution of the various application programs.

In addition, here, the communication management program is a control program previously installed in the portable information terminal 1. The program manages operations of a communication control program for a cellular network and a communication control program for a wireless LAN. The communication management unit 16 allows, in response to a request from the application programs 2A to 2N and in accordance with a communication management table 17, the communication control program for the cellular network and the communication control program for the wireless LAN to operate selectively, and allows the wireless communication mean corresponding to the selected one to transmit and receive data.

Figure 2:
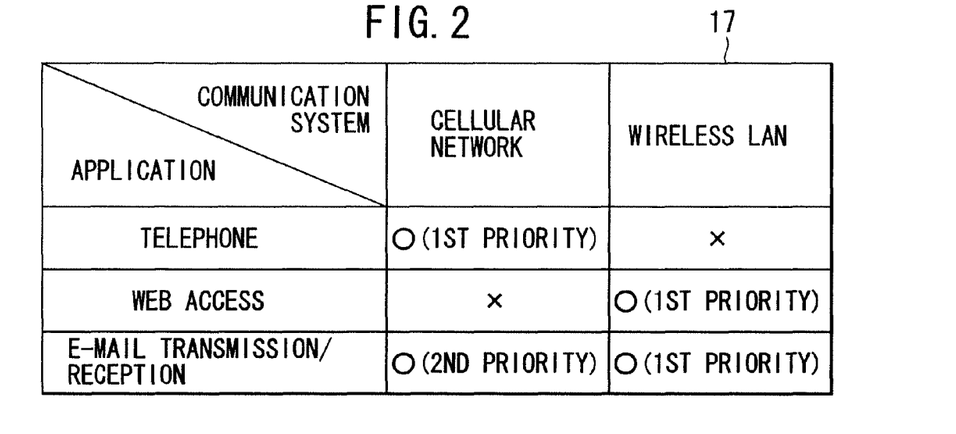
FIG. 2 is a table showing a communication management table in the portable information terminal of FIG. 1.

Here, the communication management table 17 is a table which describes the wireless communication means allowed to be used with respect to each application program, as shown in FIG. 2. When one application program allows a plurality of wireless communication means to be used, priority is established. The communication management table 17 is created by the user's setting in accordance with the communication management program.

In FIG. 2, the communication management table 17 is set so that in a case of an application program in which the portable information terminal 1 functions as a cellular phone (this case is shown as "TELEPHONE" in a corresponding column), wireless communication means for a cellular network is used, and in a case of a browser software (this case is shown as "WEB ACCESS" in a corresponding column), wireless communication means for a wireless LAN is used.

In addition, it is also set so that in a case of an e-mail software (this case is shown as "E-MAIL TRANSMISSION/RECEPTION), any of the wireless communication means for the cellular network and the wireless communication means for the wireless LAN is used, and further, the wireless communication means for the cellular network is given priority to be used.

In response to a request from the application program, the communication management unit 16 recognizes the application program and selects wireless communication means corresponding to the application program with reference to the communication management table 17. Further, in accordance with a selection, a communication control program is activated so as to start transmitting/receiving data. In this portable information terminal 1, an application judgment unit 18 for detecting an application program requested is constituted with an arithmetic processing unit carrying out the communication management program. In addition, the arithmetic processing unit executing the communication management program selects wireless communication means with reference to the communication management table 17 in accordance with the detection result from the application judgment unit 18 and activates corresponding wireless communication means so as to enable data transmission/reception. The system decision unit 20 determines a system used for data transmission/reception between the transmission/reception buffer 13 and the corresponding wireless communication means.

In a case where it is difficult to use the wireless communication means thus selected, the communication management unit 16 activates another wireless communication means having a lower priority. By the way, such a case of difficulty includes a case where the user moves into an area equipped with an incomplete cellular network. The communication management unit 16 determines whether or not it is difficult to use the corresponding wireless communication means in response to the corresponding communication control program. On the other hand, the communication control program notifies the communication management unit 16 of whether or not the corresponding wireless communication is available in accordance with a detection result of a response to a call through a control channel in a stand-by mode.

Figure 3:
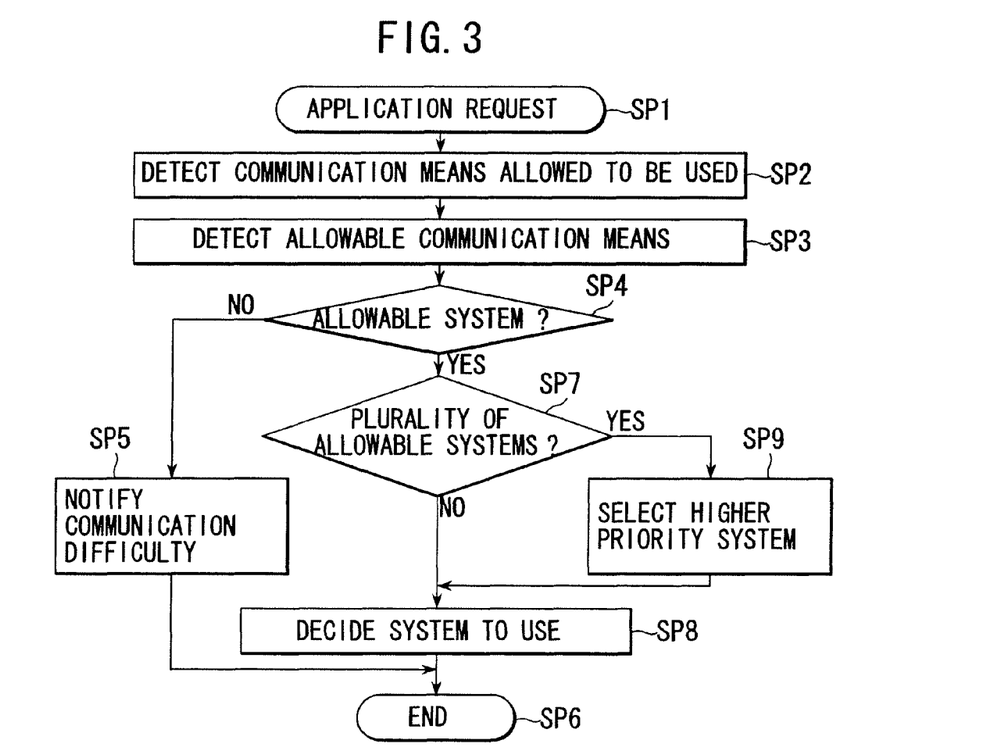
FIG. 3 is a flow chart showing processing steps in an arithmetic processing unit in the portable information terminal of FIG. 1.

FIG. 3 is a flow chart which shows processing steps by the arithmetic processing unit executing the communication management program. When the arithmetic processing unit receives a request based on an application program, the process goes from step SP1 to step SP2 so that the arithmetic processing unit detects the application program regarding the request using a function of the application judgment unit 18 and refers to the communication management table 17 in accordance with the detection result. Accordingly, the arithmetic processing unit detects the wireless communication means allowed to be used with regard to the application program.

Further, in step SP3, the arithmetic processing unit exchanges data through a communication control program constituting the detected wireless communication means so as to detect whether or not the detected wireless communication means is usable.

After receiving a notice from the wireless communication means detected with reference to the communication management table 17 regarding to whether it is available or not, the process goes to step SP4 so as to determine whether or not there is a usable communication system. When there is no usable system, the process goes from step SP4 to step SP5, and the arithmetic processing unit notifies the user of communication difficulty on the I/O means 10 through the application program which issued the request or directly. In addition, the arithmetic processing unit notifies the application program which issued the request of data transmission/reception difficulty, and the process goes to step SP6 to complete the processing steps.

On the other hand, when there is a usable communication system, the process goes from step SP4 to step SP7, and the arithmetic processing unit determines whether or not there are a plurality of usable communication systems. When there are not a plurality of usable communication systems, the process goes to step SP8 so that the arithmetic processing unit decides to exchange data through available wireless communication means and activates a communication control program corresponding to the decision so that data transmission/reception can be possible, and then, the process goes to step SP6.

On the other hand, when it is determined that there are a plurality of usable communication systems in step SP7, the process goes to step SP9 so that the arithmetic processing unit selects wireless communication means in conformity with a higher priority system. At step SP8 subsequent thereto, the arithmetic processing unit activates a communication control program corresponding to the selected wireless communication means so that data transmission/reception is possible, and the process goes to step SP6.

Accordingly, the arithmetic processing unit executes the communication control program activated in a data-exchangeable manner so as to execute data transmission/reception in accordance with the application program related to the request.

(1-2) Operation of the First Embodiment

In the above-mentioned constitution, the portable information terminal 1 accepts a setting regarding wireless communication means to be used selected from the wireless communication means for the cellular network and the wireless communication means for the wireless LAN with regard to each application program by a user's operation. This setting is stored and retained in the communication management table 17. In addition, when the user sets a plurality of wireless communication program with regard to a single application program, establishment of priority is accepted and the priority is stored and retained in the communication management table 17.

In a case where the communication management table 17 set as described above is in a condition as shown in FIG. 2 and when the user activates an application program for a telephone, in response to a request from the application program, the arithmetic processing unit refers to the communication management table 17, and detects that the user has selected data communication in a cellular network for the activated application program, for example. According to the detection result, the portable information terminal 1 detects whether or not the data communication is currently available using a communication control program of wireless communication means operable in the cellular network, and, when the data communication, that is, data exchange, is difficult, the user is notified of the difficulty. When the data communication, that is, data exchange, is available, the wireless communication means selected with reference to the communication management table 17 is activated and it establishes a connection to a target destination so as to receive and transmit voice from and to the destination.

Similarly, in a case where the user activates a browser software, since the wireless LAN is set for the browser software as shown in the communication management table 17 in FIG. 2, wireless communication means operable in the wireless LAN is activated and the user can browse a desired Internet website through the wireless communication means.

Further, when the user activates an e-mail software, since the wireless LAN with a higher priority and the cellular network with a lower priority are registered in the communication management table 17 shown in FIG. 2, the portable information terminal 1 detects whether or not data communication with these two wireless communication systems is available, that is, data exchange is available with these communication systems using a communication control program corresponding to respective communication systems. When both of the wireless LAN and the cellular network are available, the portable information terminal 1 activates wireless communication means operable in the wireless LAN in accordance with the priority set in the communication management table 17, and a connection is established through the wireless communication means so as to enable transmission and reception of e-mail.

On the other hand, when data communication is difficult in the wireless LAN with the higher priority, wireless communication means for the cellular network with the next priority is activated to establish a connection for transmitting and receiving e-mail. When data communication is difficult even in the cellular network, the user is notified of the difficulty.

According to the above-described operation, in the portable information terminal 1 of the present embodiment, the desired wireless communication means is automatically selected with regard to each application program, among a plurality of available wireless communication means, in accordance with the user's setting in advance. Thus, in the situation where a plurality of wireless communication means are available, appropriate wireless communication means is provided to the user.

(1-3) Effect of the First Embodiment

According to the above constitution, with reference to the communication management table in which at least wireless communication means which is allowed to be used is written with regard to respective application programs, wireless communication means is selectively used in accordance with the application program so that appropriate wireless communication means is provided to the user in the situation where a plurality of wireless communication means are available.

Accordingly, the application program can be comfortably used, and further, operation that the user intends regarding the application program can be assured.

In addition, at that time, since the wireless communication means indicated to be allowable in the communication management table is the wireless communication means that the user permits to be used, it is possible to provide wireless communication means which the user desires to the user.

In addition, in the case where a plurality of wireless communication means are allowed to be used for a single application program, the communication management table is constituted to have priority established and the data transmission/reception is carried out using corresponding wireless communication means in accordance with the established priority so that data communication can be possible by appropriately switching wireless communication means in accordance with the priority which the user desires even in a case where one of wireless communication means has difficulty in data communication.

(2) Second Embodiment

Figure 4:
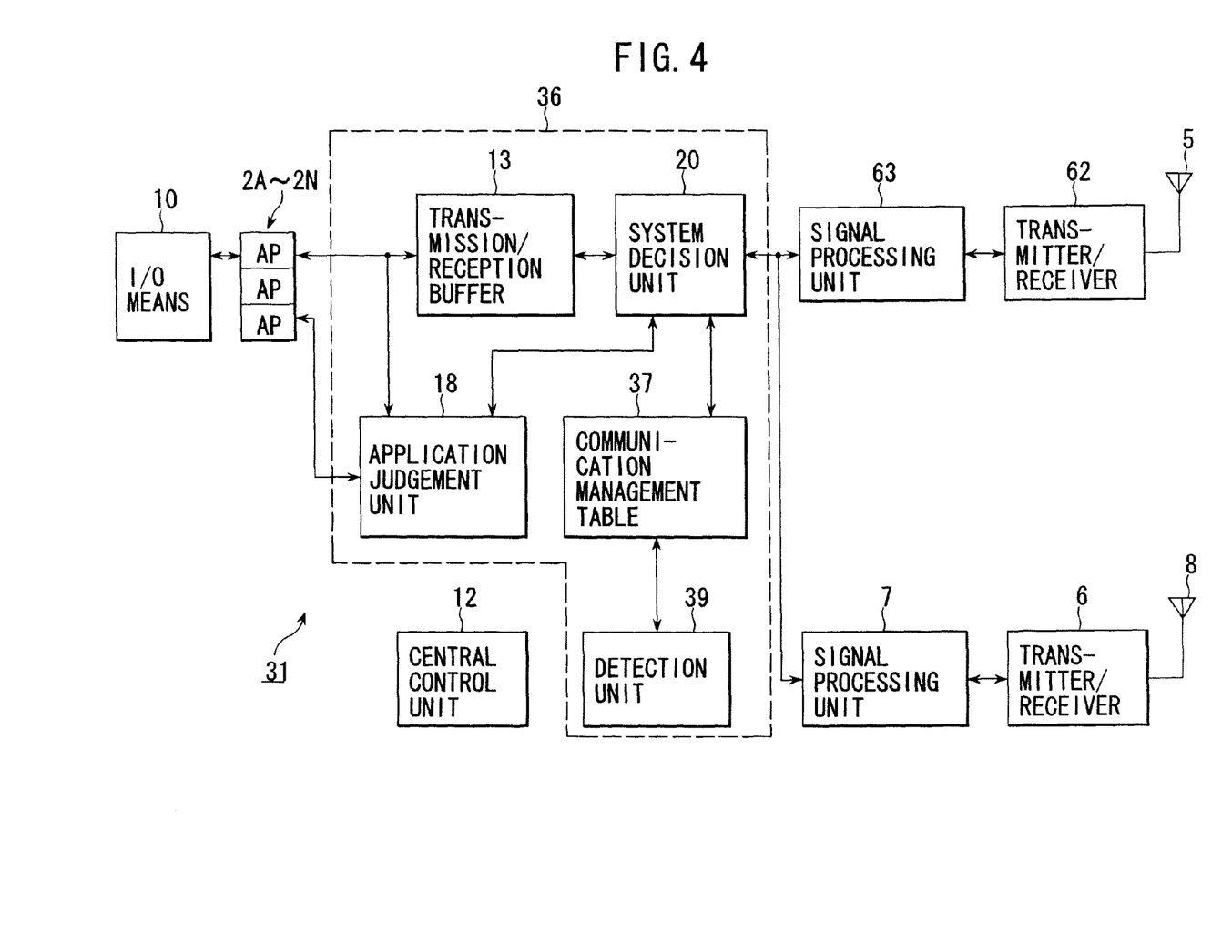
FIG. 4 is a block diagram showing a portable information terminal according to a second embodiment of the present invention.

FIG. 4 is a block diagram showing a portable information terminal 31 according to a second embodiment of the present invention. In the following description regarding the portable information terminal 31, elements similar to those in the portable information terminal 1 described above with reference to FIG. 1 are shown with the same reference numerals and repeated description is omitted.

In the portable information terminal 31, a communication management unit 36 transmits and receives data using wireless communication means corresponding to a request from an application program, with reference to a communication management table 37, as in the case of the first embodiment. In the processing, the communication management unit 36 detects using a detector 39 whether or not data transmission and reception by wireless communication means is possible, and update the communication management table 37 appropriately in accordance with the detection result. Accordingly, in the present embodiment, wireless communication means capable of data transmission/reception is recorded in the communication management table 37, as the wireless communication means allowed to be used.

Figure 5:
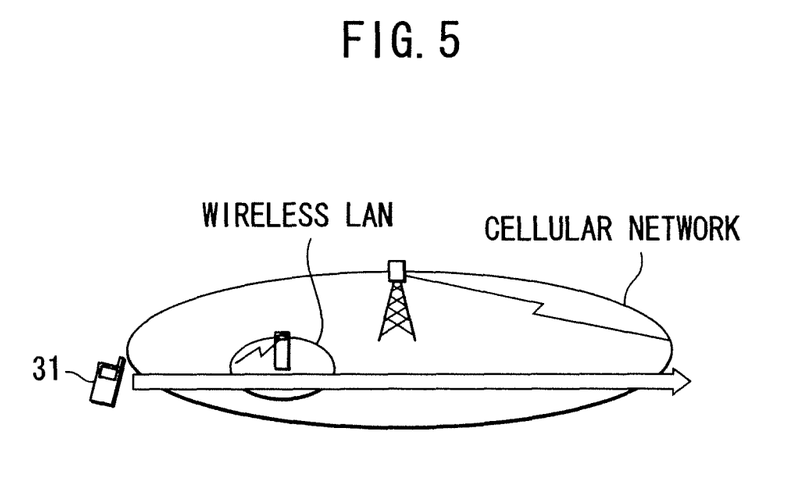
FIG. 5 is a schematic diagram showing relationship between a cellular network and a wireless LAN in a case of a portable information terminal passing at a high speed.

In other words, as shown in FIG. 5, for example, comparing the wireless LAN and the cellular network, the wireless LAN has a narrower communication area so that disconnection occurs in the wireless LAN when the portable information terminal 31 moves at high speed. Accordingly, in such a case, a communication system which the user can use comfortably is limited to the cellular network.

Figure 6:
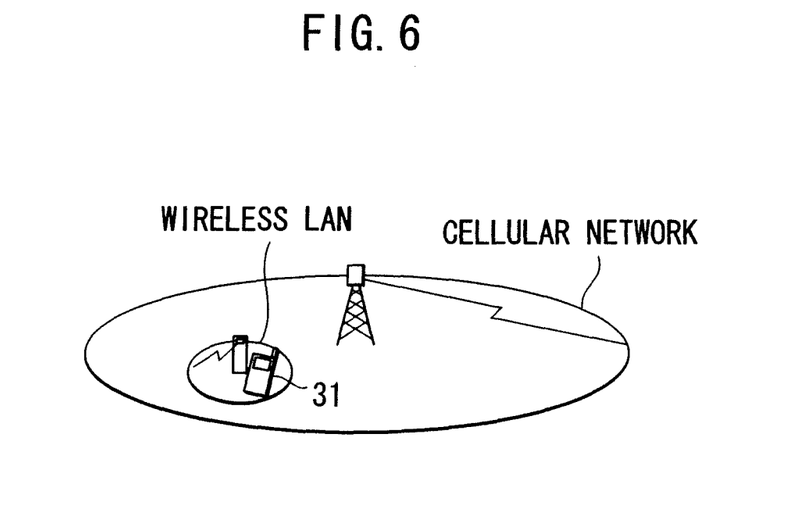
FIG. 6 is a schematic diagram showing relationship between the cellular network and the wireless LAN in a case of the terminal passing at a low speed in comparison with FIG. 5.

On the other hand, as shown in FIG. 6, in a case where the portable information terminal 31 moves at low speed, any of the wireless LAN and the cellular network can be used. In addition, if the portable communication terminal is to go beyond the communication area of the wireless LAN, data exchange can be continued by a handover processing to the cellular network.

Therefore, in the present embodiment, the detector 39 detects the moving speed of the portable information terminal 31 using a function of a built-in GPS (Global Positioning System). In the case of moving at high speed, the wireless LAN is set disabled in the communication management table 17. Conversely, in the case of moving at low speed, the disabled setting of the wireless LAN in the communication management table 17 is enabled. According to such operations, in the present invention, whether or not data transmission/reception through the wireless communication means is possible is detected with reference to the moving speed of the terminal, the contents in the communication management table 17 are dynamically updated depending on the detection result.

The communication management unit 36 switches wireless communication means used for data transmission/reception depending on the update of the communication management table 17 when the table is updated in this way so as to effectively avoid disconnection during the data communication.

According to the constitution of FIG. 4, whether or not the data transmission/reception through the wireless communication means is possible is detected so as to update the communication management table in accordance with the detection result. Thus, in addition to the effects of the first embodiment, the user can be provided with further suitable wireless communication means.

In addition, by switching the wireless communication means used for data transmission/reception depending on such update of the communication management table, disconnection during the data communication can be effectively avoided and a stable communication can be assured.

(3) Third Embodiment

Figure 7:
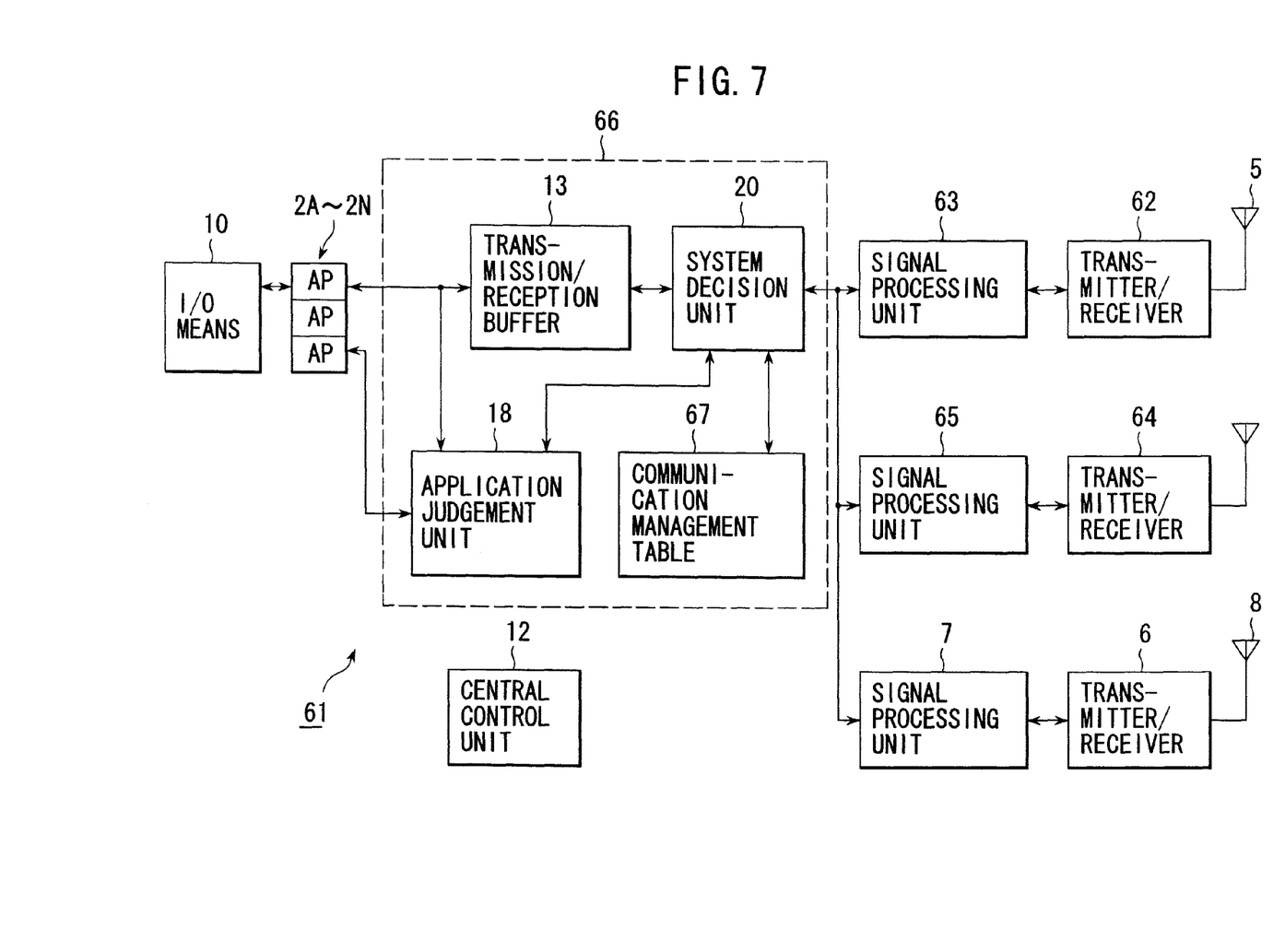
FIG. 7 is a block diagram showing a portable information terminal according to a third embodiment of the present invention.

FIG. 7 is a block diagram showing a portable information terminal 61 according to a third embodiment of the present invention. In the following description regarding the portable information terminal 61, elements similar to those in the portable information terminal 1 described above with reference to FIG. 1 are shown with the same reference numerals and repeated description is omitted.

The portable information terminal 61 comprises wireless communication means for a wireless LAN, wireless communication means for a cellular phone network, and wireless communication means for a PHS (Personal Handy Phone System). The wireless communication means for the wireless LAN is composed of a transmitter/receiver 6, a signal processing unit 7 and a wireless communication program for managing the transmitter/receiver 6 and the signal processing unit 7. The wireless communication means for the cellular phone is composed of a transmitter/receiver 62, a signal processing unit 63 and a wireless communication program for managing the transmitter/receiver 62 and the signal processing unit 63. The wireless communication means for the PHS is composed of a transmitter/receiver 64, a signal processing unit 65 and a wireless communication program for managing the transmitter/receiver 64 and the signal processing unit 65.

According to the above-described arrangement, the portable information terminal 61 has, in comparison with the portable information terminals 1 and 31 according to the embodiments described above, larger number of selectable wireless communication means, and it is possible to carry out assured data communication by switching these large number of wireless communication means.

In a communication management unit 66 of the portable information terminal 61, information showing relationship between application programs which are the same kind but function differently from each other and a wireless communication means, and information restricting a function of an application program are recorded in a communication management table 67 with regard to each wireless communication means, respectively. The communication management unit 66 switches the application program in accordance with the information indicating the relationship, or switches the function of the application program in accordance with the information restricting the function after switching the wireless communication means.

In other words, when a specific application program is used, there may occurs a case where data communication is available with a further appropriate communication system in comparison with the communication system currently in use. In addition, conversely, there may be a case where the communication system currently in use becomes disabled and should be switched to another communication system while the specific application program is being used.

In a case of switching the communication system in this way, there may occur a case where a normal data communication is not available any more through the processing of the application program which has been previously used due to a large change in data transfer rate.

In other words, it is a case where data communication in the wireless LAN became difficult to be switched to the wireless communication means for the cellular phone in a case where wireless communication means for the wireless LAN, whose data transfer rate is relatively large, has been previously used for data communication through an application program of video phones. In this case, although communication via the videophone becomes difficult, normal voice communication can be maintained. In other words, in this case, if the application program for the videophone has a communication function only through a normal voice communication, the communication function through the video phone carried out by the application program is switched to the communication function through the voice communication so that the communication can be maintained even when the wireless communication means is switched. In addition, in a case where such switching of the functions is not available, an application program for the voice communication is activated instead of the application program for the videophone so that the communication can be maintained through the application program for the voice communication.

In addition, conversely, in a case of the voice communication using the wireless communication means for the cellular phone and the wireless communication means for the wireless LAN becomes available and the wireless communication means is switched, the communication only through voice can be switched to the communication through the video phone by switching the application program or by switching the function of the application program.

According to the operation, in specific, information regarding switching to another wireless communication means, including one indicating relationship with the application program which is the same kind but has a different function and another restricting the function of a single application program is recorded, with regard to each wireless communication means, in the communication management table 67.

Figure 8:
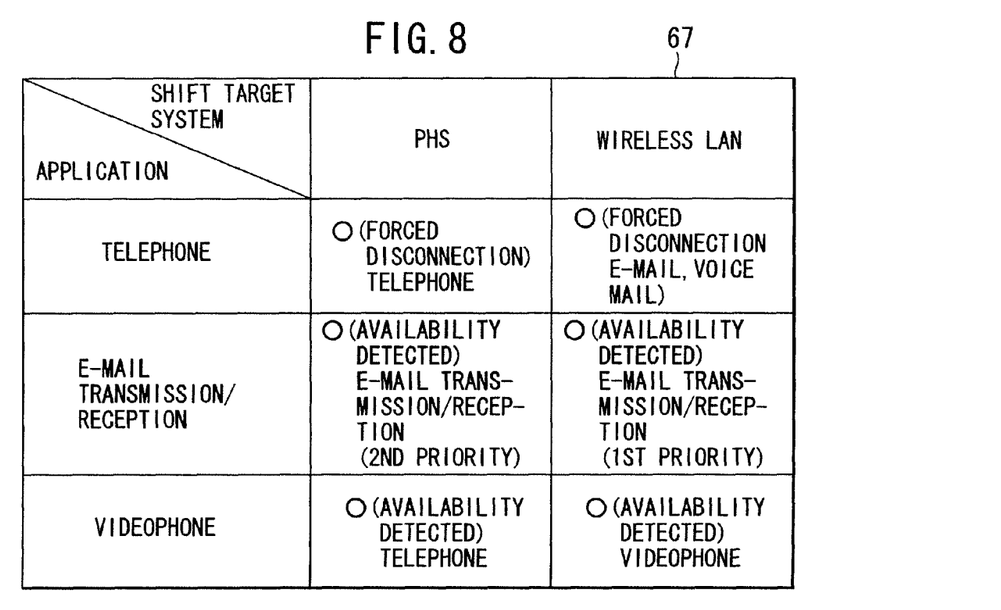
FIG. 8 is a table showing information regarding switching from wireless communication means for a cellular phone to another wireless communication means described in a communication management table in the portable information terminal of FIG. 7.

FIG. 8 is a chart showing these kinds of information with regard to the wireless communication means for the cellular phone at the time of switching to the other wireless communication means. Referring to FIG. 8, first, an example of the application program regarding a telephone will be described. When the wireless communication means is switched to the one for the PHS and the one for the wireless LAN, a case where retransmission requests frequently occur in the wireless communication means for the cellular phone and a line is to be forcedly disconnected is recorded in a corresponding column for the wireless communication means as a switching requirement. In FIG. 8, such a requirement is indicated in parentheses as "FORCED DISCONNECTION". When switching to the wireless communication means for the PHS, it is described in a column corresponding to the PHS that the function of telephone is maintained. In FIG. 8, this is shown as "TELEPHONE" in the corresponding column. In addition, in a case of switching to the wireless LAN, it is described in the column of the wireless LAN that the function is switched to e-mail system through a voice-mail system in which a voice is transmitted and received as an attached file. This case is described in FIG. 8 as "E-MAIL""VOICEMAIL". In the case of such a voicemail, if the application program for the cellular phone has a function of voicemail, functions of the application program other than the function of voicemail are disabled. On the other hand, if the application program for the cellular phone does not have the function of voicemail, an e-mail software having the function of the voicemail and an application program related thereto are activated.

Next, an example of an application regarding e-mail transmission/reception will be described. A case where data communication through each of the wireless LAN and the PHS become available is described in each of the columns of the wireless LAN and the PHS as a requirement of switching. Such a requirement is indicated in parentheses as "AVAILABILITY DETECTED" in FIG. 8. In addition, it is described in each corresponding column in FIG. 8 that upon switching the wireless communication means, the function of e-mail transmission/reception, that is, the application for the e-mail transmission/reception, is maintained and that the wireless LAN has a higher priority than the PHS.

In addition, with regard to an application program for the videophone, a case where data communication through each of the wireless LAN and the PHS is available, is described in each of the columns as a requirement for switching. Upon switching to the PHS, switching from the videophone to communication only through voice is described in a corresponding column, as "TELEPHONE" in FIG. 8. Upon switching to the wireless LAN, it is described in a corresponding column that the function of videophone is maintained, as "VIDEOPHONE".

Figure 9:
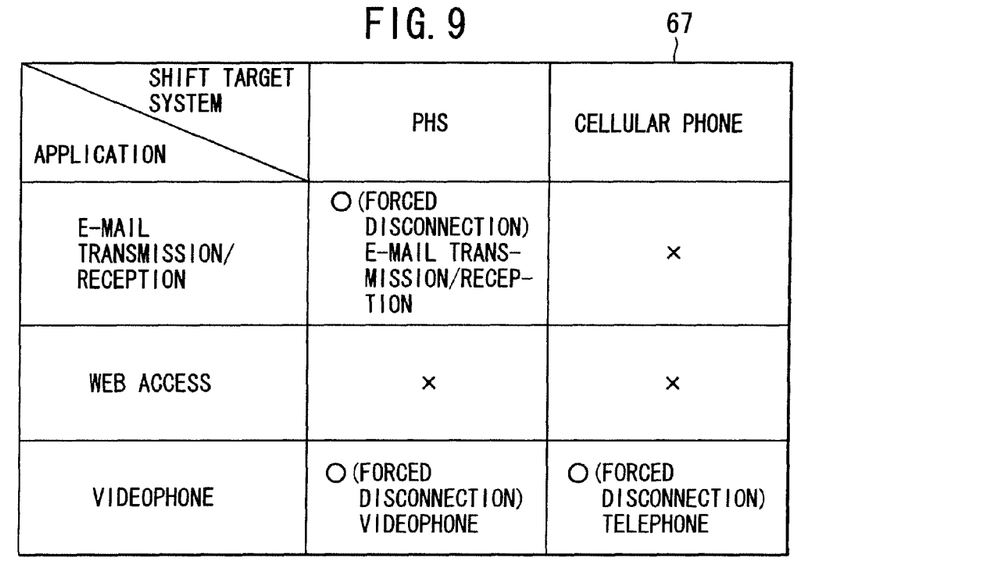
FIG. 9 is a table showing information regarding switching from wireless communication means for a wireless LAN to another wireless communication means described in the communication management table in the portable information terminal of FIG. 7.

FIG. 9 is a chart showing these kinds of information at the time of switching from the wireless communication means for wireless LAN to the other wireless communication means. In the wireless LAN, data transfer rate is extremely higher than the other wireless communication means employed in the present embodiment. Therefore, in this case, it is described in the columns corresponding to the wireless communication means for the cellular phone that no switching is performed with regard to the e-mail software and the browser software. Such a case is described in the FIG. 9 with x. With regard to the e-mail software, upon switching to the PHS, a case where retransmission requests frequently occur in the wireless communication means for the wireless LAN and a line is to be forcedly disconnected is recorded in a corresponding column as a switching requirement. This is shown with the word "FORCED DISCONNECTION" in parentheses in the column. In addition, it is also described in the column that the function of e-mail is maintained.

With regard to the browser software, it is described that no switching is performed with regard to the PHS. In addition, in the videophone, a case where a line is to be forcedly disconnected is recorded in each of the columns of the wireless communication means as a switching requirement. FIG. 9 indicates such a requirement as in "FORCED DISCONNECTION" in parentheses. It is described that upon switching to the PHS, the function of the videophone is maintained ("VIDEOPHONE" in FIG. 9) and, upon switching to the cellular phone, the function is limited only to the voice communication ("TELEPHONE" in FIG. 9), in a corresponding column.

Accordingly, the communication management unit 66 monitors, even in a case of exchanging data through single wireless communication means, a status of the wireless communication means by exchanging data between the communication control program of the wireless communication means currently exchanging data and the communication control program of the other wireless communication means, so as to appropriately switch the wireless communication means in accordance with the description in the communication management table 67. In response to the switching, the function of the application program is restricted or the other application program is activated in accordance with the record in the communication management table 67.

Figure 10:
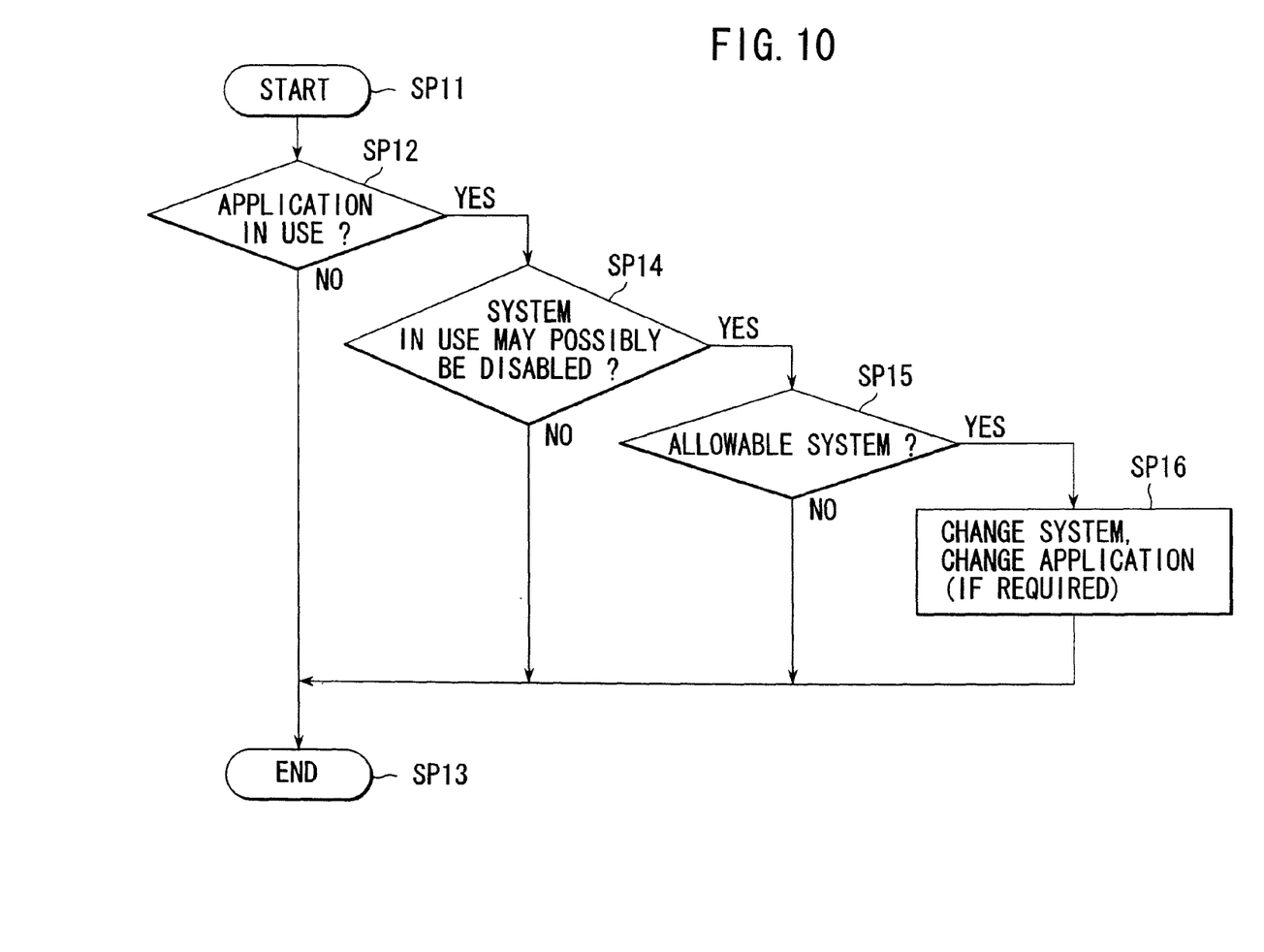
FIG. 10 is a flow chart showing processing steps in an arithmetic processing unit in the portable information terminal of FIG. 7.

FIG. 10 is a flow chart showing processing steps which an arithmetic processing unit for executing the communication management program in the communication management unit 66 at the time of switching to the wireless communication means having a lower priority. The priority below described in an order depending on the data transfer rate. The one with a higher transfer rate is given a higher priority. The arithmetic processing unit carries out the processing steps at a constant time interval. The process goes from step SP11 to step SP12 so that the arithmetic processing unit determines whether or not any of the wireless communication means is in use through an application program. If it is judged there is no means in use, the process goes to step SP13 to terminate the processing.

On the other hand, if it is judged that there is any means in use, the process goes from step SP12 to step SP14. Here, the arithmetic processing unit judges possibility of the system of the wireless communication means in use will be disabled. The possibility to be disabled is judged depending on a frequency of the above-mentioned retransmission requests. If it is judged that there is no possibility, the process goes from step SP13 from step SP14 and the arithmetic processing unit terminates the processing.

On the other hand, if there is any possibility that it will be difficult to use the wireless communication means currently in use, the step goes from step SP14 to step SP15. At the step SP15, it is judged whether or not there is other usable wireless communication means. Here, the judgment depends on a response from the other communication control programs. If it is judged that there is no usable wireless communication means, the process goes from step SP15 to step SP13 so that the arithmetic processing unit terminates the processing. On the other hand, if it is judged that there is any usable wireless communication means at step SP15, the process goes from step SP15 to step SP 16. Here the arithmetic processing unit switches the wireless communication means in accordance with the description in the communication management table 67 and, at the same time, restricts the function of the application program or activates another application program. Then, the process goes to step SP13, and the processing is finished.

Figure 11:
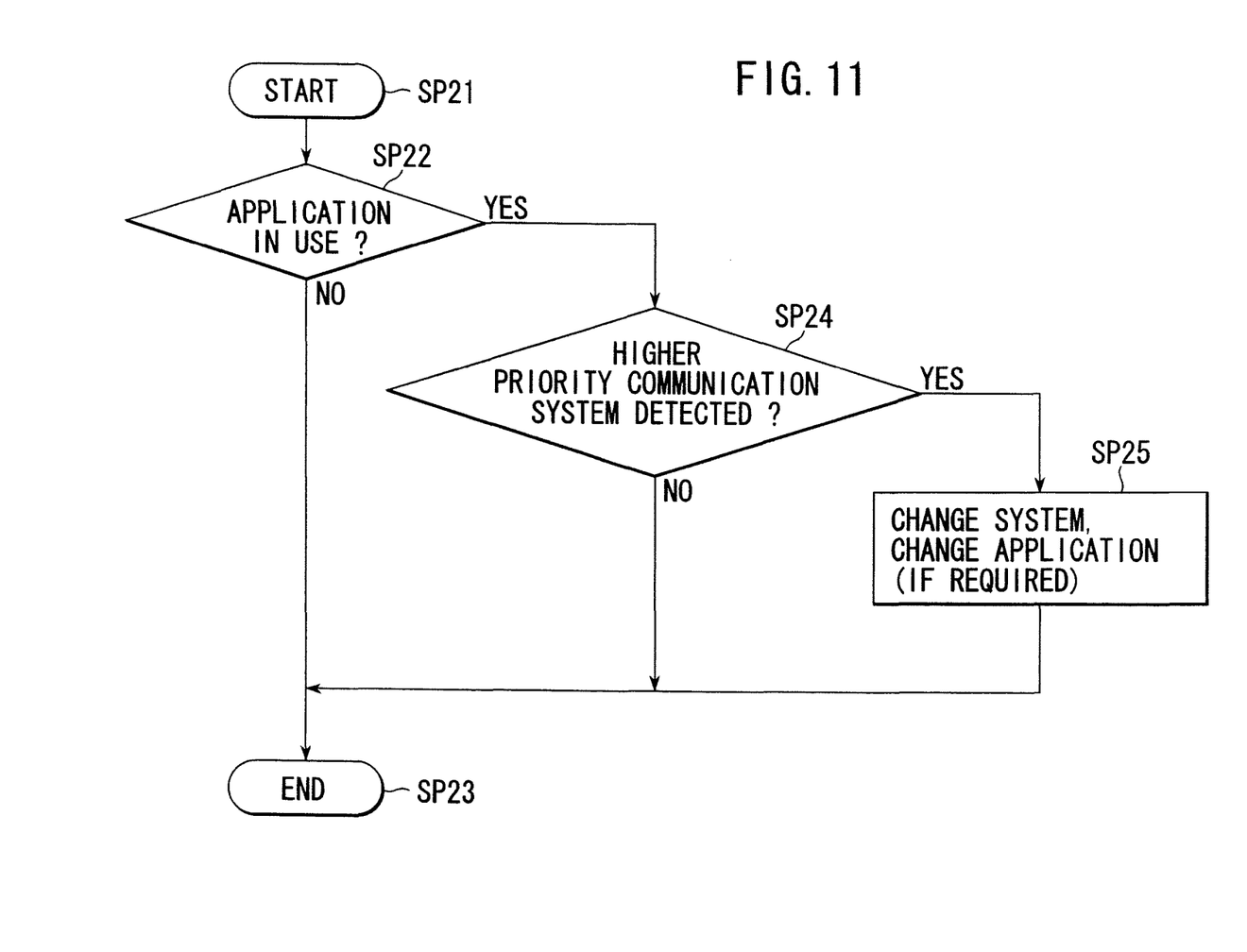
FIG. 11 is a flow chart showing processing steps switching to a higher priority side in an arithmetic processing unit in the portable information terminal of FIG. 7.

FIG. 11 is a flow chart showing processing steps which an arithmetic processing unit for executing the communication management program in the communication management unit 66 at the time of switching to the wireless communication means having a higher priority. The arithmetic processing unit carries out the processing steps at a constant time interval. The process goes from step SP21 to step SP22 so that the arithmetic processing unit determines whether or not any of the wireless communication means is in use through an application program. If there is no means in use, the process goes to step SP23 to terminate the processing.

On the other hand, if it is judged that there is any means in use at step SP22, the process goes from step SP22 to step SP24. The arithmetic processing unit judges whether or not there is other wireless communication means available with higher priority. Here, the judgment depends on a response from the other communication control programs. If it is judged that there is no available wireless communication means with higher priority, the process goes from step SP24 to step SP23 so that the arithmetic processing unit terminates the processing. On the other hand, if it is judged that there is any available wireless communication means with higher priority at step SP24, the process goes from step SP24 to step SP25. Here the arithmetic processing unit switches the wireless communication means in accordance with the description in the communication management table 67 and, at the same time, restricts the function of the application program or activates another application program. Then, the process goes to step SP 23, and the processing is finished.

According to FIG. 7, information indicating relationship between an application program and another application program which are the same kind but function differently from each other, and information restricting a function of an application program are recorded with regard to each wireless communication means to form a communication management table. In response to the switching of the wireless communication means, the function of the application program is switched in accordance with these kinds of information so that further suitable wireless communication means can be provided to the user.

(4) Other Embodiments

In the second embodiment, the case where the moving speed of the portable information terminal is detected using the built-in GPS has been described. However, the present invention is not limited to the case. In a case of in-vehicle equipment, the moving speed may be detected using a car audio system or using a mechanism of a speed meter.

In addition, in the above embodiment, the case of detecting whether or not the data transmission/reception is possible depending upon the moving speed, the response from a base station and the frequency of the retransmission requests has been described. However, the present invention is not limited to the case. Various judging methods can be widely applied to the present invention, for example, depending upon the frequency of error occurrence and electric field strength.

In addition, in the above embodiment, the case of using the application programs including the e-mail software and the browser software has been described. However, the present invention is not limited to the case. The present invention may be widely applied to cases where wireless communication means is used for transmission/reception of various data, including a case of using a browser software for video delivered through streaming.

In addition, the case of using wireless communication means for PHS, cellular phone and wireless LAN has been described in the above embodiment. However, the present invention is not limited to the case. The present invention may be widely applied to cases of using other various wireless communication means.

In addition, the case of executing the series of processing through the processing program previously installed has been described in the above embodiment. However, the present invention is not limited to the case. The series of processing may be executed through a processing program obtained via a network or may be executed by installing a program provided through various recording media. Such recording media include a magnetic disk, an optical disc, a magnetic tape and the like.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed:
1. A portable information terminal comprising:
a cellular interface;
a wireless local area network interface; and
circuitry configured to
    identify a moving speed of the portable information terminal; and
    select one of the cellular interface and the wireless local area network interface to transmit and receive data in response to a request received from at least one of a plurality of applications based on the moving speed of the portable information terminal and stored priority information specific to the at least one of the plurality of applications between the cellular interface and the wireless local area network interface when both of the cellular interface and the wireless local area network interface are usable by the at least one of the plurality of applications generating the request.

2. The portable information terminal of claim 1, wherein:
the priority information between the cellular interface and the wireless local area network interface is identified in response to a user input.

3. A method of controlling a portable information terminal having a cellular interface and a wireless local area network interface, comprising:
identifying a moving speed of the portable information terminal;
selecting, in response to a request received from at least one of a plurality of applications, one of the cellular interface and the wireless local area network interface to transmit and receive data based on the moving speed of the portable information terminal and stored priority information specific to the at least one of the plurality of applications between the cellular interface and the wireless local area network interface when both of the cellular interface and the wireless local area network interface are usable by the at least one of the plurality of applications generating the request; and
transmitting and receiving the data using the selected at least one of the cellular interface and the wireless local area network interface.

4. The method of claim 3, wherein:
the priority between the cellular interface and the wireless local area network interface is identified in response to a user input.

5. A program embedded in a non-transitory computer readable medium and having instructions that implement a method of controlling a portable information terminal having a cellular interface and a wireless local area network interface, comprising:
identifying a moving speed of the portable information terminal;
selecting, in response to a request received from at least one of a plurality of application programs, one of the cellular interface and the wireless local area network interface to transmit and receive data based on the moving speed of the portable information terminal and stored priority information specific to the at least one of the plurality of applications between the cellular interface and the wireless local area network interface when both of the cellular interface and the wireless local area network interface are usable by the at least one of the plurality of applications generating the request; and
transmitting and receiving the data using the selected at least one of the cellular interface and the wireless local area network interface.

6. The program of claim 5, wherein:
the priority between the cellular interface and the wireless local area network interface is identified in response to a user input.

7. The portable information terminal of claim 1, wherein:
the stored priority information includes first information specific to a first of the plurality of applications that indicates a higher priority for the cellular interface than the wireless local area network interface, and second information specific to a second of the plurality of applications that indicates a higher priority for the wireless local area network interface than the cellular interface.

8. The method of claim 3, wherein:
the stored priority information includes first information specific to a first of the plurality of applications that indicates a higher priority for the cellular interface than the wireless local area network interface, and second information specific to a second of the plurality of applications that indicates a higher priority for the wireless local area network interface than the cellular interface.

9. The program of claim 5, wherein:
the stored priority information includes first information specific to a first of the plurality of applications that indicates a higher priority for the cellular interface than the wireless local area network interface, and second information specific to a second of the plurality of applications that indicates a higher priority for the wireless local area network interface than the cellular interface.

10. The portable information terminal of claim 1, wherein:
the first of the plurality of applications is a telephone application, and
the circuitry is configured to select the cellular interface to transmit and receive data in response to a request received from the telephone application based on the first information included in the stored priority information when both of the cellular interface and the wireless local area network interface are usable by the telephone application generating said request.

11. The portable information terminal of claim 1, wherein:
the second of the plurality of applications is a browser application, and
the circuitry is configured to select the wireless local area network interface to transmit and receive data in response to a request received from the browser application based on the second information included in the stored priority information when both of the cellular interface and the wireless local area network interface are usable by the browser application generating said request.

12. The portable information terminal of claim 1, wherein:
the second of the plurality of applications is an email application, and
the circuitry is configured to select the wireless local area network interface to transmit and receive data in response to a request received from the email application based on the second information included in the stored priority information when both of the cellular interface and the wireless local area network interface are usable by the email application generating said request.

13. The portable information terminal of claim 1, wherein:
the circuitry is configured to select only the cellular interface when the moving speed exceeds a predetermined threshold value.

14. The portable information terminal of claim 1, wherein the circuitry is configured to:
compare the moving speed to a predetermined threshold value;
select only the cellular interface when it is determined that the moving speed is greater than the predetermined threshold value; and
select between the cellular interface and the wireless local area network interface when it is determined that the moving speed is less than the predetermined threshold value.

15. The portable information terminal of claim 1, wherein:

the circuitry is configured to omit the wireless local area network interface as a candidate when the moving speed exceeds a predetermined threshold value.

16. An information apparatus comprising:
a cellular interface;
a wireless local area network interface; and
circuitry configured to
identify a moving speed of the information processing apparatus; and
select one of the cellular interface and the wireless local area network interface to transmit and receive data in response to a request received from at least one of a plurality of applications based on the moving speed of the information processing apparatus and stored priority information specific to the at least one of the plurality of applications between the cellular interface and the wireless local area network interface when both of the cellular interface and the wireless local area network interface are usable by the at least one of the plurality of applications generating the request.

17. The information processing apparatus of claim 16, wherein:
the priority information between the cellular interface and the wireless local area network interface is identified in response to a user input.

18. The information processing apparatus of claim 16, wherein:
the circuitry is configured to identify the moving speed of the information processing apparatus using at least one of a GPS system or a vehicle's speedometer.

19. The information processing apparatus of claim 16, wherein:
the information processing apparatus is configured to be mounted in a vehicle.

20. A method performed by an information processing apparatus having a cellular interface and a wireless local area network interface, the method comprising:
identifying a moving speed of the information processing apparatus;
selecting, in response to a request received from at least one of a plurality of applications, one of the cellular interface and the wireless local area network interface to transmit and receive data based on the moving speed of the information processing apparatus and stored priority information specific to the at least one of the plurality of applications between the cellular interface and the wireless local area network interface when both of the cellular interface and the wireless local area network interface are usable by the at least one of the plurality of applications generating the request; and
transmitting and receiving the data using the selected at least one of the cellular interface and the wireless local area network interface.

21. The method of claim 20, wherein:
identifying the moving speed of the information processing apparatus is performed using at least one of a GPS system or a vehicle's speedometer.

22. The method of claim 20, wherein:
the information processing apparatus is configured to be mounted in a vehicle.

* * * * *